US009118880B2

(12) United States Patent
Hong

(10) Patent No.: US 9,118,880 B2
(45) Date of Patent: Aug. 25, 2015

(54) IMAGE APPARATUS FOR PRINCIPAL COMPONENTS ANALYSIS BASED ILLUMINANT ESTIMATION

(75) Inventor: Li Hong, San Diego, CA (US)

(73) Assignee: NIKON CORPORATION, Tokyo (JP)

( * ) Notice: Subject to any disclaimer, the term of this patent is extended or adjusted under 35 U.S.C. 154(b) by 443 days.

(21) Appl. No.: 13/119,641

(22) PCT Filed: Sep. 24, 2008

(86) PCT No.: PCT/US2008/077565
§ 371 (c)(1),
(2), (4) Date: Mar. 17, 2011

(87) PCT Pub. No.: WO2010/036247
PCT Pub. Date: Apr. 1, 2010

(65) Prior Publication Data
US 2011/0169979 A1    Jul. 14, 2011

(51) Int. Cl.
*H04N 9/73*    (2006.01)
(52) U.S. Cl.
CPC . *H04N 9/735* (2013.01); *H04N 9/73* (2013.01)
(58) Field of Classification Search
CPC ..... H04N 9/3179; H04N 9/3182; H04N 9/73; H04N 9/735; H04N 9/74; H04N 1/4074; H04N 5/335; G06T 9/007; G06T 7/408; G06T 2207/10024
USPC ................. 348/222.1–238; 382/165
See application file for complete search history.

(56) References Cited

U.S. PATENT DOCUMENTS

| 5,752,106 A | 5/1998 | Yamano |
| 6,038,339 A * | 3/2000 | Hubel et al. ................. 382/162 |
| 6,711,293 B1 | 3/2004 | Lowe |

(Continued)

FOREIGN PATENT DOCUMENTS

| WO | WO2010036240 A1 | 4/2010 |
| WO | WO2010036246 A1 | 4/2010 |

(Continued)

OTHER PUBLICATIONS

L. Lucchese and S.K. Mitra, Unsupervised Segmentation of Color Images Based on k-means Clustering in the Chromaticity Plane, 1999, Content-Based Access of Image and Video Libraries, 1999. (CBAIVL '99) Proceedings. IEEE Workshop.*

(Continued)

*Primary Examiner* — Pritham Prabhakher
(74) *Attorney, Agent, or Firm* — Roeder & Broder LLP

(57) ABSTRACT

An image apparatus for providing an estimated illuminant of a scene and subsequently providing an adjusted image of the scene includes a capturing system and an illuminant database. The capturing system captures information for an input image of the scene. The input image is defined by a plurality of input colors. The illuminant database includes a separate subspace of information for a plurality of possible illuminants. The subspaces can be created from multi-dimensional color information from its respective possible illuminant that is computed using Principal Components Analysis. This allows for more accurate illuminant estimation of the scene and the use of Principal Components Analysis to generate the one or more subspaces allows for accurate and relatively easy generation of the subspaces. Additionally, the image apparatus can include a control system that compares the input colors to the subspaces in the illuminant database.

15 Claims, 9 Drawing Sheets

(56) References Cited

U.S. PATENT DOCUMENTS

| | | | |
|---|---|---|---|
| 6,744,923 B1 | 6/2004 | Zabih et al. | |
| 6,973,212 B2 | 12/2005 | Boykov et al. | |
| 6,985,622 B2 * | 1/2006 | Hubel | 382/165 |
| 7,010,167 B1 * | 3/2006 | Ordowski et al. | 382/225 |
| 7,019,776 B1 * | 3/2006 | Lin | 348/223.1 |
| 7,218,344 B2 * | 5/2007 | Cooper | 348/223.1 |
| 7,440,611 B2 * | 10/2008 | Qian et al. | 382/165 |
| 7,720,371 B2 | 5/2010 | Hong et al. | |
| 7,889,207 B2 | 2/2011 | Hong et al. | |
| 8,064,110 B2 * | 11/2011 | Noyes et al. | 358/504 |
| 8,229,215 B2 * | 7/2012 | Li | 382/167 |
| 8,340,412 B2 * | 12/2012 | Lang et al. | 382/165 |
| 8,430,412 B2 * | 4/2013 | Sanvido et al. | 280/47.11 |
| 8,564,687 B2 * | 10/2013 | Goel et al. | 348/223.1 |
| 2002/0113881 A1 | 8/2002 | Funston et al. | |
| 2003/0035156 A1 * | 2/2003 | Cooper | 358/516 |
| 2004/0008886 A1 | 1/2004 | Boykov | |
| 2004/0201766 A1 | 10/2004 | Funston et al. | |
| 2004/0258305 A1 | 12/2004 | Burnham et al. | |
| 2005/0169519 A1 | 8/2005 | Minakuti et al. | |
| 2005/0182328 A1 * | 8/2005 | Matsumoto et al. | 600/476 |
| 2005/0271273 A1 | 12/2005 | Blake et al. | |
| 2006/0045353 A1 * | 3/2006 | Brand | 382/224 |
| 2006/0177128 A1 * | 8/2006 | Raghupathy et al. | 382/167 |
| 2007/0031037 A1 | 2/2007 | Blake et al. | |
| 2007/0146498 A1 * | 6/2007 | Kim et al. | 348/223.1 |
| 2008/0025627 A1 | 1/2008 | Freeman et al. | |
| 2008/0175508 A1 | 7/2008 | Bando et al. | |
| 2008/0175576 A1 | 7/2008 | Hong | |
| 2008/0219549 A1 | 9/2008 | Dolan et al. | |
| 2008/0252748 A1 * | 10/2008 | Meka et al. | 348/223.1 |
| 2009/0303336 A1 * | 12/2009 | Utsugi | 348/222.1 |
| 2010/0054549 A1 * | 3/2010 | Steinberg et al. | 382/118 |
| 2010/0086206 A1 | 4/2010 | Hong | |
| 2010/0260431 A1 | 10/2010 | Tezaur | |
| 2010/0272356 A1 | 10/2010 | Hong | |
| 2011/0019909 A1 | 1/2011 | Farid et al. | |
| 2011/0019932 A1 | 1/2011 | Hong | |

FOREIGN PATENT DOCUMENTS

| | | |
|---|---|---|
| WO | WO2010036247 A1 | 4/2010 |
| WO | WO2010036248 A1 | 4/2010 |
| WO | WO2010036249 A1 | 4/2010 |
| WO | WO2010036250 A1 | 4/2010 |
| WO | WO2010036251 A1 | 4/2010 |

OTHER PUBLICATIONS

PCT International Search Report and Written Opinion for PCT/US2008/77565 (related to present application) dated Dec. 4, 2008, Nikon Corporation.

Murali Subbarao, Tae Choi, Arman Nikzad, "Focusing Techniques", Tech. Report Sep. 4, 1992, Dept. of Electrical Engineering, State Univ. of NY at Stony Brook, Stony Brook, NY 11794-2350.

Agarwala et al., "Interactive digital photomontage", pp. 1-9, Proceedings of ACM SIGGRAPH 2004, http://grail.cs.washington.edu/projects/photomontage.

Li Hong and George Chen,"Segment-based Stereo Matching Using Graph Cuts",0-7695-2158-4/04 (C) 2004 IEEE, Proceedings of IEEE computer vision and pattern recognition 2004.

Milan Mosny et al., Multispectral color constancy: real image tests, School of Computing Science, Simon Fraser University, Burnaby, BC, Canada V5A 1S6, Human Vision and Electronic Imaging XII, SPIE vol. 6492, Jan. 2007, San Jose, CA (Copyright SPIE 2007).

M. Bertero and P. Boccacci, A Simple Method for the Reduction of Boundary Effects in the Richardson-Lucy Approach to Image Deconvolution, Mar. 17, 2005, Astronomy and Astrophysics manuscript No. aa2717-05, DISI, University of Genova, Genova Italy.

David S.C. Biggs and M. Andrews, Acceleration of Iterative Image Restoration Algorithms, Mar. 10, 1997, vol. 36, No. 8 pp. 1766-1775, Applied Optics, Optical Society of America, US.

Robert J. Hanisch et al., Denconvolution of Hubble Space Telescope Images and Spectra, Space Telescope Science Institute, Baltimore, MD, 1997, Chapter 10, pp. 310-361, Deconvolution of Images and Spectra Second Edition, Acadamic Press, Space Telescope Science Institute, Baltimore, Maryland, US.

L.B. Lucy, An Iterative Technique for the Rectification of Observed Images, The Astronomical Journal, 1974, vol. 79: pp. 745-754, University of Chicago, US.

W.H. Richardson, Bayesian-based Iterative Method of Image Restoration, J. Opt. Soc. Am., 1972, vol. 62, pp. 55-59, NW Washington, DC, US.

PCT Notification Concerning Transmittal of Preliminary Report on Patentability, along with Written Opinion dated Dec. 4, 2008 for PCT/US2008/077565 (related to the present application), publication date Apr. 7, 2011, Nikon Corporation.

* cited by examiner

| Non-redundant Input colors 762 | First Possible Illuminant 554A Separation Distance 770 | Second Possible Illuminant 554B Separation Distance 770 | ... | N Possible Illuminant Separation Distance 770 |
|---|---|---|---|---|
| I.C. 1 | 0 | 11 | | 0 |
| I.C. 2 | 5 | 2 | | 0 |
| I.C. 3 | 11 | 9 | | 0 |
| I.C. 4 | 2 | 6 | | 0.1 |
| I.C. 5 | 6.5 | 2 | | 0.5 |
| ... | | | | |
| I.C. N | 2 | 1 | | 0 |
| Total Consistency Error 772 | 155 | 109 | | 10 |

Fig. 7C

| Non-redundant Input colors 762 | First Possible Illuminant 554A Separation Distance 770 | Second Possible Illuminant 554B Separation Distance 770 | ... | N Possible Illuminant Separation Distance 770 |
|---|---|---|---|---|
| I.C. 1 | 0 | 8 | | 0 |
| I.C. 2 | 5 | 2 | | 0 |
| I.C. 3 | 8 | 8 | | 0 |
| I.C. 4 | 2 | 6 | | 0.1 |
| I.C. 5 | 6.5 | 8 | | 0.5 |
| ... | | | | |
| I.C. N | 2 | 1 | | 0 |
| Total Consistency Error 772 | 132 | 97 | | 10 |

IMAGE APPARATUS FOR PRINCIPAL COMPONENTS ANALYSIS BASED ILLUMINANT ESTIMATION

BACKGROUND

Cameras are commonly used to capture an image of a scene. Most scenes are not illuminated by a 100% pure white illuminant. For example, sunlight at midday is much closer to white than the late afternoon or morning sunlight which includes more yellow. The color of light reflected from an object will vary according to the color of the illuminant that is illuminating the scene. As a result thereof, for example, if the illuminant produces light that includes a lot of yellow, a white object in the scene will not be captured as a white object with a typical film type camera. This is commonly referred to as illuminant color casting because the illuminant causes the color casting.

Recently, some digital cameras include a program that first estimates the color of the illuminant, and subsequently adjusts all of the colors in an input image according to the color of the illuminant. This is commonly referred to as white balance correction. With white balance correction, the digital camera attempts to compensate for variations in the colors in the input image caused by an off-white illuminant, and the actual color of the objects in the scene are more accurately represented in the provided image.

Unfortunately, existing white balance correction programs have not been able to quickly and accurately estimate the correct illuminant in all situations. Further, some white balance correction programs are extremely complex to implement and are computationally expensive.

SUMMARY

The present invention is an image apparatus for providing an estimated illuminant of a scene and subsequently providing an adjusted image of a scene. The image apparatus includes a capturing system and an illuminant database. The capturing system captures information for an input image of the scene. Moreover, the input image is defined by a plurality of input colors. In one embodiment, the illuminant database includes a subspace of information for a plurality of possible illuminants. In certain embodiments, at least one of the subspaces is created from multi-dimensional color information from its respective possible illuminant that is computed using Principal Components Analysis. As a result of this design, the use of multi-dimensional color information allows for more accurate illuminant estimation of the scene, and the use of Principal Components Analysis to generate the one or more subspaces allows for accurate and relatively easy generation of the subspaces.

In one embodiment, the multi-dimensional color information is in chromatic space. With this design, the calculations are simplified.

Additionally, the image apparatus can include a control system that compares the input colors of the input image to the subspace for each of the possible illuminants. For example, the control system can compute a distance between the input colors and the subspace for each of the possible illuminants. The distance can be a root mean square distance.

In certain embodiments, the control system incorporates brightness information of the input colors when computing the distance from the input colors and the subspace for each of the possible illuminants.

Additionally, or alternatively, the control system can take a non-uniform summation of the scaled distance from the input colors to the subspace.

The present invention is also directed to method for estimating a possible illuminant of a scene. The method can include the step of creating an illuminant database that includes a separate subspace for each of a plurality of possible illuminants, wherein at least one of the subspaces is created from multi-dimensional color information from its respective possible illuminant that is computed using Principal Components Analysis.

With the present design, the control system provides an estimated illuminant from the illuminant database with improved efficiency. After estimating the illuminant, the control system can apply the correct level of color adjustment to the input image to provide an adjusted image that accurately approaches the true colors in the scene.

As utilized herein, the terms "true colors" or "actual colors" shall mean the colors that are present at the scene when the scene is illuminated by a white light, such as standard illuminant D65.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 7C is a chart that includes a non-redundant list of input colors and their respective separation distances for a plurality of possible illuminants;

FIG. 7D is another chart that includes a non-redundant list of input colors and their respective separation distances for a plurality of possible illuminants;

DESCRIPTION

Figure 1:
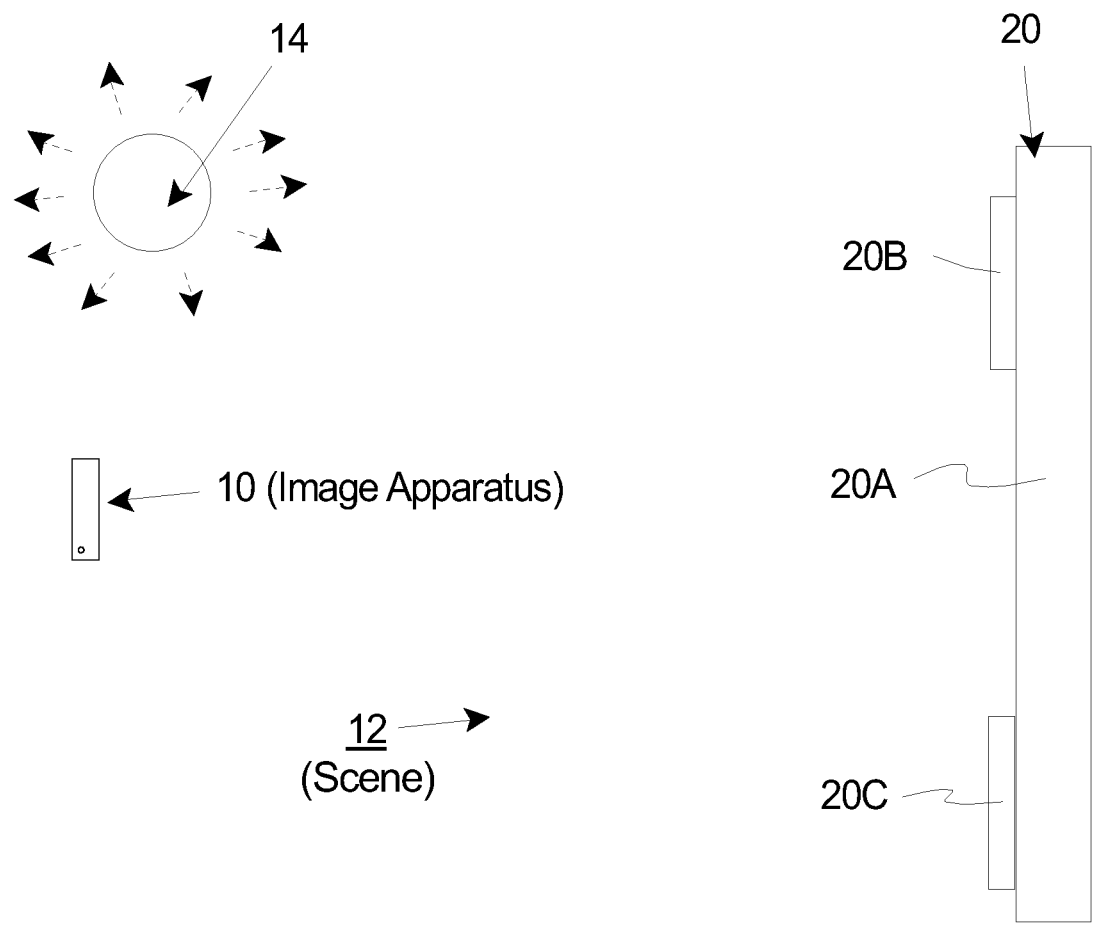
FIG. 1 is a simplified top plan view of a scene and an image apparatus having features of the present invention.

FIG. 1 is a simplified top plan illustration of an image apparatus 10 and a scene 12 that is illuminated by an illuminant 14. The image apparatus 10 is designed to (i) capture an input image 616 (illustrated in FIG. 6), (ii) evaluate the input image 616 to estimate the illuminant 14, and (iii) perform white balance adjustment on the input image 616 based on the estimated illuminant to provide an adjusted image 218 (illustrated in FIG. 2B). As an overview, in certain embodiments, the present invention is directed to an improved method for generating an illuminant database 245 (illustrated in FIG. 2A) of possible illuminants and an improved method for estimating the illuminant from the possible illuminants. As a result thereof, the image apparatus 10 is more likely to provide the correct color correction, the image apparatus 10 estimates the illuminant with relatively simple computations, and the adjusted image 218 more accurately approaches the true colors in the scene 12.

The type of scene 12 captured by the image apparatus 10 can vary. For example, the scene 12 can include one or more objects 20, e.g. animals, plants, mammals, and/or environments. For simplicity, in FIG. 1, the scene 12 is illustrated as including three objects 20. Alternatively, the scene 12 can include more than three or less than three objects 20.

In FIG. 1, one of the objects 20 is a wall 20A, one of the objects 20 is a first painting 20B attached to the wall 20A, and one of the objects 20 is a second painting 20C attached to the wall 20A.

The design and location of the illuminant 14 that illuminates the scene 12 can vary greatly. In FIG. 1, the illuminant 14 is a fluorescent lamp positioned away from the wall 20A. Non-exclusive examples of other possible illuminants 14 can include (i) the sun at sunrise with a clear sky, (ii) the sun at sunset with a clear sky, (iii) the sun at midday with a clear sky, (iv) an electronic flash, (v) a flashlight, (vi) the sun with a moderately overcast sky, (vii) the sun with shade or a heavily overcast sky, (viii) an incandescent bulb, or (ix) a candle.

As is known, the color of each object in the input image 616 will depend upon the characteristics of the illuminant 14, each object's surface reflectance characteristics, and the camera sensor response characteristics. There are two types of color casting: one is caused by the illuminant, one is caused by the scene content (e.g., a scene with only a red paper).

In FIG. 1, the illuminant 14 is positioned outside the scene 12. Alternatively, the illuminant 14 can be part of the scene 12 captured by the image apparatus 10.

In certain embodiments, the image apparatus 10 is water resistant and is adapted to capture images of scenes that are partly or fully in a liquid such as water. Alternatively, the image apparatus 10 can be enclosed by an outer shell (not shown) that surrounds and encloses the image apparatus 10 and that provides a watertight barrier around the image apparatus 10.

Figure 2A:
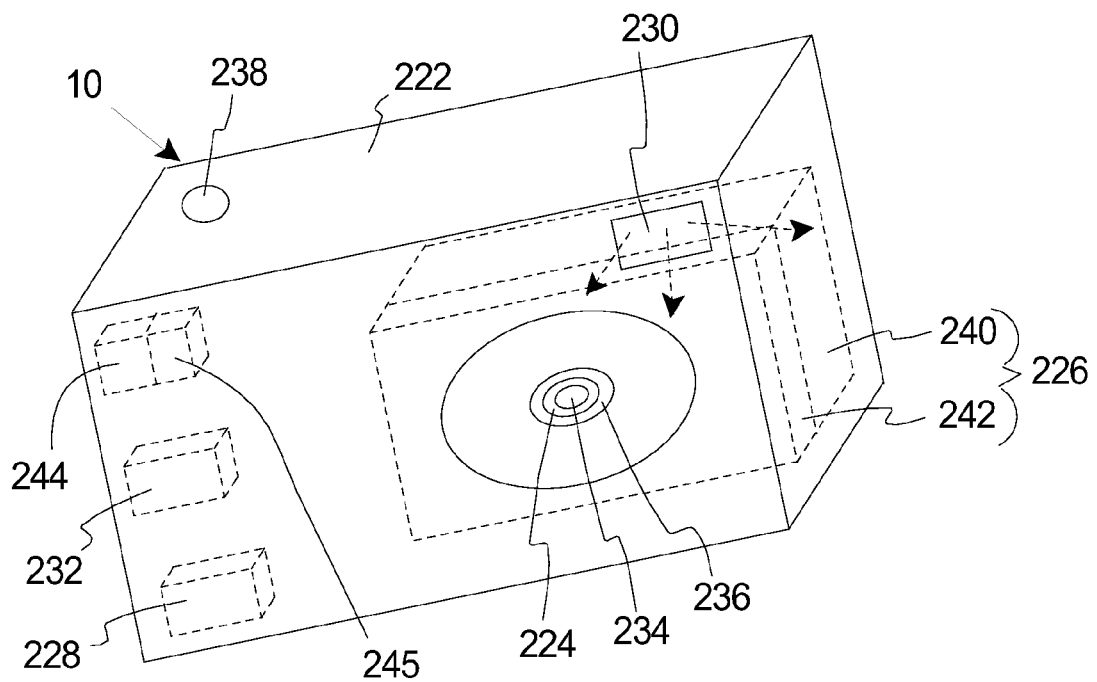
FIG. 2A is a simplified front perspective view of one embodiment of the image apparatus.

FIG. 2A illustrates a simplified, front perspective view of one, non-exclusive embodiment of the image apparatus 10. In this embodiment, the image apparatus 10 is a digital camera, and includes an apparatus frame 222, an optical assembly 224, a capturing system 226 (illustrated as a box in phantom), a power source 228 (illustrated as a box in phantom), a flash system 230, and a control system 232 (illustrated as a box in phantom). The design of these components can be varied to suit the design requirements and type of image apparatus 10. Further, the image apparatus 10 could be designed without one or more of these components. For example, the image apparatus 10 could be designed without the flash system 230.

The apparatus frame 222 can be rigid and support at least some of the other components of the image apparatus 10. In one embodiment, the apparatus frame 222 includes a generally rectangular shaped hollow body that forms a cavity that receives and retains at least a portion of the capturing system 226.

The apparatus frame 222 can include an aperture 234 and a shutter mechanism 236 that work together to control the amount of light that reaches the capturing system 226. In certain embodiments, the size of the aperture 234 is automatically adjustable by the control system 232 to control the amount of light that reaches the capturing system 226.

The shutter mechanism 236 can be activated by a shutter button 238. The shutter mechanism 236 can include a pair of blinds (sometimes referred to as "blades") that work in conjunction with each other to allow the light to be focused on the capturing system 226 for a certain amount of time ("exposure time"). Alternatively, for example, the shutter mechanism 236 can be all electronic and contain no moving parts. For example, an electronic capturing system 226 can have the exposure time controlled electronically to emulate the functionality of the blinds. In one embodiment, the exposure time is automatically adjustable by the control system 232 to control the amount of light that reaches the capturing system 226.

The optical assembly 224 can include a single lens or a combination of lenses that work in conjunction with each other to focus light onto the capturing system 226. In one embodiment, the image apparatus 10 includes an autofocus assembly (not shown) including one or more lens movers that move one or more lenses of the optical assembly 224 until the sharpest possible image of the subject is received by the capturing system 226.

The capturing system 226 captures information for the input image 616. The design of the capturing system 226 can vary according to the type of image apparatus 10. For a digital type camera, the capturing system 226 includes an image sensor 240 (illustrated in phantom), a filter assembly 242 (illustrated in phantom), and a storage system 244 (illustrated in phantom).

The image sensor 240 receives the light that passes through the aperture 234 and converts the light into electricity. One non-exclusive example of an image sensor 240 for digital cameras is known as a charge coupled device ("CCD"). An alternative image sensor 240 that may be employed in digital cameras uses complementary metal oxide semiconductor ("CMOS") technology.

The image sensor 240, by itself, produces a grayscale image as it only keeps track of the total intensity of the light that strikes the surface of the image sensor 240. Accordingly, in order to produce a full color image, the filter assembly 242 is necessary to capture the colors of the image.

It should be noted that other designs for the capturing system 226 can be utilized. It should also be noted, as discussed in more detail below, with information from the capturing system 226, the control system 232 can selectively compensate the colors in the raw input image 516.

The storage system 244 stores the various images before the images are ultimately printed out, deleted, transferred or downloaded to an auxiliary compensation system (not shown in FIG. 2A), an auxiliary storage system or a printer. The storage system 244 can be fixedly or removably coupled to the apparatus frame 222. Non-exclusive examples of suitable storage systems 244 include flash memory, a floppy disk, a hard disk, or a writeable CD or DVD.

The power source 228 provides electrical power to the electrical components of the image apparatus 10. For example, the power source 228 can include one or more chemical batteries, either the one time use disposable batteries (such as alkaline, zinc-air), or the multiple use rechargeable batteries (such as nickel-cadmium, nickel-metal-hydride, lead-acid, lithium-ion).

The flash system 230 provides a flash of light that can be used to selectively illuminate at least a portion of the scene 12 (illustrated in FIG. 1).

In one embodiment, the control system 232 is electrically connected to and controls the operation of the electrical components of the image apparatus 10. The control system 232 can include one or more processors and circuits and the control system 232 can be programmed to perform one or more of the functions described herein. In FIG. 2A, the control system 232 is coupled to the apparatus frame 222 and is positioned within the apparatus frame 222.

Additionally, as provided herein, the control system 232 includes software that evaluates the input colors from the input image 616 of the scene and uses an illuminant estimation procedure to estimate the illuminant. Subsequently, the control system 232 can adjust the color of the input image 616 based on the estimated illuminant to provide the adjusted image 218.

As provided herein, an illuminant database 245 (illustrated as a box) is stored in the storage system 244 for access by the control system 232 during the illuminant estimation procedure.

In one embodiment, the illuminant database 245 includes a separate M-dimensional subspace for each of a plurality of possible illuminants. For example, the illuminant database 245 can store a separate M-dimensional subspace for at least approximately 5, 10, 15, 20, 25, 30, 35, 40, 50, or more different possible illuminants. The accuracy of the estimation can increase as the number of possible illuminants in the illuminant database 245 is increased.

Non-exclusive, specific examples for possible illuminants in the illuminant database 245 can include (i) a M-dimensional subspace for a fluorescent light, (ii) a M-dimensional subspace for an incandescent light, (iii) a M-dimensional subspace for a candlelight, (iv) a M-dimensional subspace for the sun at sunrise with a clear sky, (v) a M-dimensional subspace for the sun at sunset with a clear sky, (vi) a M-dimensional subspace for the sun at midday with a clear sky, (vii) a M-dimensional subspace for an electronic flash, (viii) a M-dimensional subspace for a flashlight, (ix) a M-dimensional subspace for the sun with a moderately overcast sky, and/or (x) a M-dimensional subspace for the sun with shade or a heavily overcast sky.

The creation and use of the Illuminant database 245 is described in more detail below.

Figure 2B:
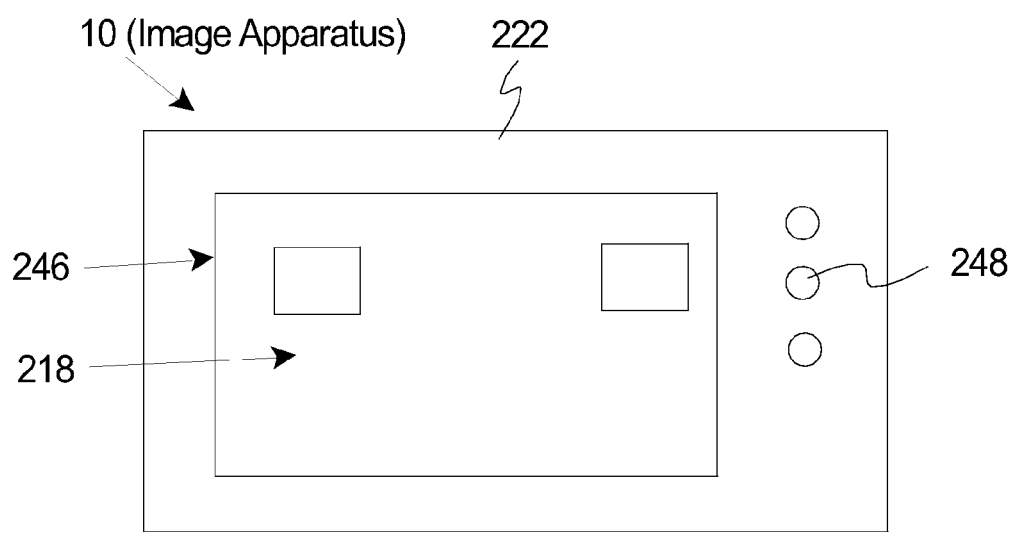
FIG. 2B is a simplified rear view of the image apparatus of FIG. 2A and an adjusted image of the scene of FIG. 1.

Referring to FIG. 2B, the image apparatus 10 can include an image display 246 which displays the adjusted image 218 and/or the raw input image. With this design, the user can decide which adjusted images 218 should be stored and which adjusted images 218 should be deleted. In FIG. 2B, the image display 246 is fixedly mounted to the apparatus frame 222 on the back side. Alternatively, the image display 246 can be secured to the apparatus frame 222 with a hinge mounting system (not shown) that enables the display to be pivoted away from the apparatus frame 222. One non-exclusive example of an image display 246 includes an LCD screen.

Further, the image display 246 can display other information such as the time of day, and the date.

Moreover, the image apparatus 10 can include one or more control switches 248 electrically connected to the control system 232 that allows the user to control the functions of the image apparatus 10. Additionally, one or more of the control switches 248 can be used to selectively switch the image apparatus 10 to the white balance adjustment mode in which one or more of the adjustment features disclosed herein is activated.

As mentioned above, in certain embodiments, the present invention provides a unique method for generating the subspaces for each of the possible illuminants. As provided herein, color information is captured or generated for each of the possible illuminants. In one embodiment, the color information is at least three dimensional information, namely red ("r"), blue ("b"), and green (g). Alternatively, the multi-dimensional information can be greater than three dimensional or two dimensional.

Figure 3A:
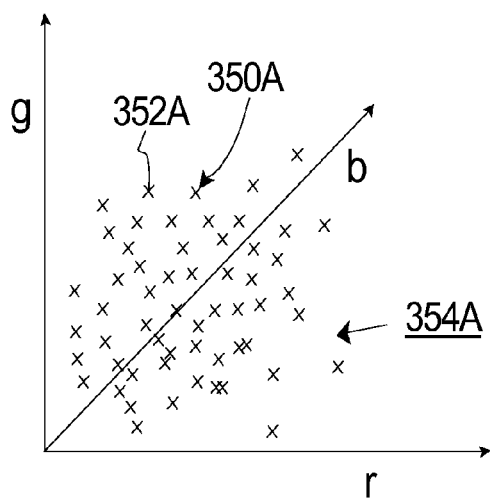
FIG. 3A is a graph that illustrates multi-dimensional information for a first possible illuminant.
Figure 3B:
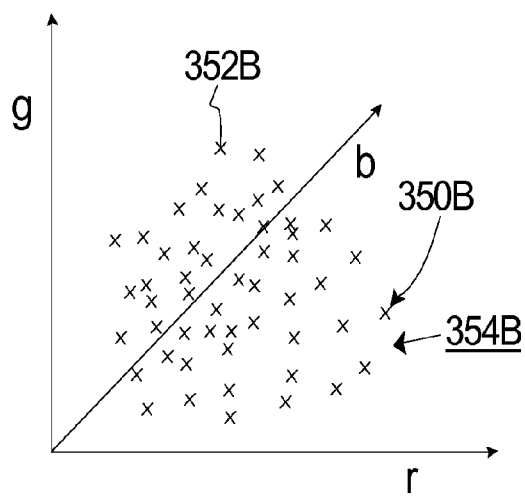
FIG. 3B is a graph that illustrates multi-dimensional information for a second possible illuminant.

FIG. 3A is a multi-dimensional graph that illustrates a first gamut 350A of first observable colors 352A that are possible when a scene is illuminated by a first possible illuminant 354A. In this example, each of the first colors 352A has a red value, a blue value and a green value. Somewhat similarly, FIG. 3B is a multi-dimensional graph that illustrates a second gamut 350B of second observable colors 352B that are possible when a scene is illuminated by a second possible illuminant 354B. In this example, each of the second colors 352B has a red value, a blue value and a green value.

It should be noted that the three dimensional information illustrated in FIGS. 3A and 3B are merely examples that were created to facilitate this discussion and are not the three dimensional color information for any actual illuminant. Further, depending upon the characteristics of the illuminant, the three dimensional information will be different than those illustrated in FIGS. 3A and 3B.

Alternatively, instead of three dimensional color information, the color information can be at least approximately four, five, six, seven, eight, nine, or more dimensions. With this design, the present invention can be used with cameras that capture information in more than three dimensions.

The method used to collect the color information for each possible illuminant 354A, 354B can vary. For example, the multi-dimensional color information can be captured by directly taking pictures for the various illuminants and various scenes. Another way to obtain the multi-dimensional color information is to synthesize the observable illuminant colors for each possible illuminant 354A, 354B.

In certain embodiments, the present invention provides a unique method to reduce the multi-dimensional data to a lower dimensional subspace while retaining the essential information for each possible illuminant 354A, 354B. The use of the lower dimensional subspace simplifies the calculations needed to estimate the illuminant from the list of possible illuminants 354A, 354B. For example, six dimensional data can be reduced to five, four, or three dimensional subspace, three dimensional data can be reduced to a two dimensional subspace, or two dimensional data can be reduced to one a dimensional subspace.

Figure 4A:
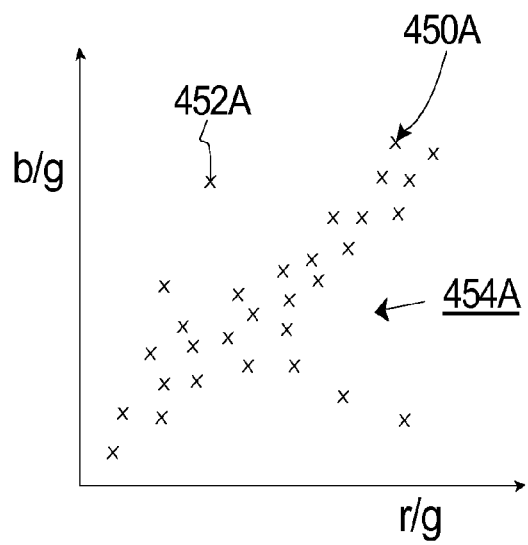
FIG. 4A is a graph that illustrates multi-dimensional information for a first possible illuminant in chromatic space.
Figure 4B:
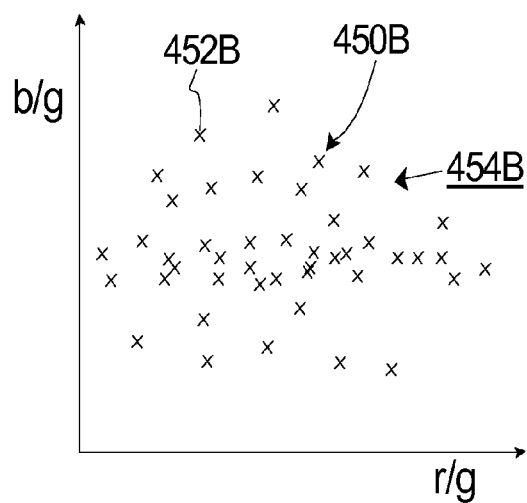
FIG. 4B is a graph that illustrates multi-dimensional information for a second possible illuminant in chromatic space.

In certain embodiments, the three dimensional observable colors 352A, 352B can be expressed in the two dimensional chromatic space. More specifically, FIG. 4A illustrates the first gamut 450A of possible first colors 452A for the first possible illuminant 454A in the chromatic space, and FIG. 4B illustrates the second gamut 450B of possible second colors 452B of the second possible illuminant 454B in the chromatic space. The exact chromatic space can be selected to achieve the best performance and implementation efficiency of the system. For example, the chromatic space can be (i) rb (r/g, b/g); (ii) rg (r/b, g/b); (iii) bg (b/r, g/r); (iv) rgb_rb (r/r+g+b, b/r+g+b); (v) rgb_rg (r/r+g+b, g/r+g+b); or (vi) rgb_bg (b/r+g+b, g/r+g+b). With this design, the gamuts of possible colors 450A, 450B are now expressed in two dimensional space. This can simplify the calculations necessary to estimate the illuminant from the possible illuminants. Further, chromatic space can lead to better separation among the different illuminants and improved illuminant estimation accuracy.

In FIGS. 4A and 4B the chromatic space is rb. It should be noted that the two dimensional information illustrated in FIGS. 4A and 4B are merely examples that were created to facilitate this discussion and are not the two dimensional color information for any actual illuminant. Further, depending upon the characteristics of the illuminant, the two dimensional information will be different than those illustrated in FIGS. 4A and 4B.

As provided herein, for each possible illuminant 454A, 454B, an M-dimensional subspace is fitted over the possible colors 452A, 452B. The M-dimensional subspace will represent the new gamut of the possible colors. In one embodiment, principal components analysis (PCA) is used to reduce multidimensional data sets to lower dimensions for analysis. PCA can be used to dimensionally reduce the data sets while retaining those characteristics of the data set that contribute most, by keeping lower-order principal components and ignoring higher-order ones. Such low-order components often contain the "most important" aspects of the data.

For example, the PCA can be performed on the three dimensional colors 352A, 352B illustrated in FIGS. 3A, 3B or the two dimensional colors 452A, 452B illustrated in FIGS. 4A, 4B.

With PCA, if X represents the original data set, where each column is a single sample (e.g., the three dimensional RGB color data, the two dimensional chromatic color data, or N-dimensional color data), each row represents a different repetition of the data collection (e.g., all possible three dimensional RGB color data, the two dimensional chromatic color data, or N-dimensional color data under each illuminant). In this example, X can be denoted as an mXn matrix, and Y can be another mXn matrix related to X by a linear transformation P (mXm matrix), such that:

$$PX=Y$$

Let P=[P1 P2 ... Pi ... Pm]^T, Pi are the rows of P. The PCA method attempts to find P as an orthonormal matrix (i.e., Pi*Pj=delta (I,j)). In addition, PCA assumes that the directions with the largest variances are the most important, in other word, most principal. The PCA orders its rows from most principle to less, and these are the principal components.

Figure 5A:
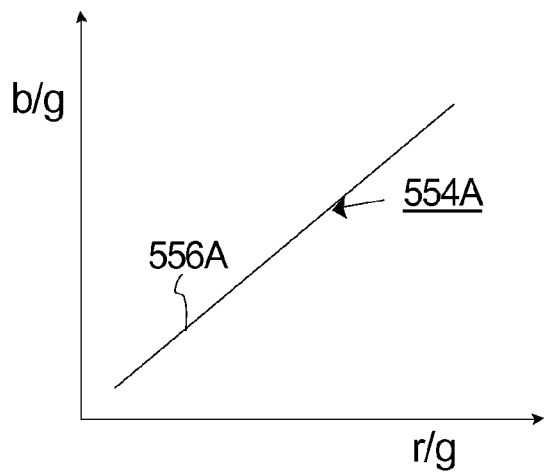
FIG. 5A is graph that illustrates a subspace for the first possible illuminant.
Figure 5B:
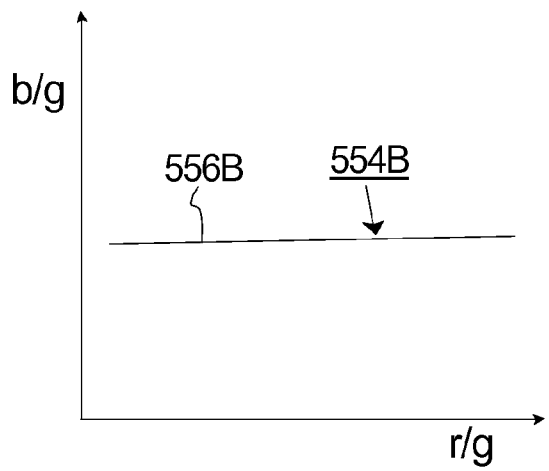
FIG. 5B is graph that illustrates a subspace for the second possible illuminant.

FIG. 5A is a simplified graph that illustrates the one dimensional chromatic subspace 556A for the first possible illuminant 554A that results from performing PCA on the two dimensional first gamut 450A (illustrated in FIG. 4A). Somewhat similarly, FIG. 5B is simplified graph that illustrates the one dimensional chromatic subspace 556B for the second possible illuminant 554B that results from performing PCA on the two dimensional second gamut 450B (illustrated in FIG. 4B). These subspaces 556A, 556B can be just two possible examples of the plurality of subspaces that are stored in the storage system 244 (illustrated in FIG. 2A).

It should be noted that the subspaces 556A, 556B are merely examples that were created to facilitate this discussion and are not the subspaces 556A, 556B for any actual illuminant. Further, depending upon the characteristics of the illuminant 554A, 554B, the subspaces 556A, 556B will be different than those illustrated in FIGS. 5A and 5B.

In one embodiment, the subspaces 556A, 556B for each of the plurality of possible illuminants is pre-generated and is transferred to the storage system 244 (illustrated in FIG. 2A) of the image apparatus 10 for access by the control system 232.

Figure 6:
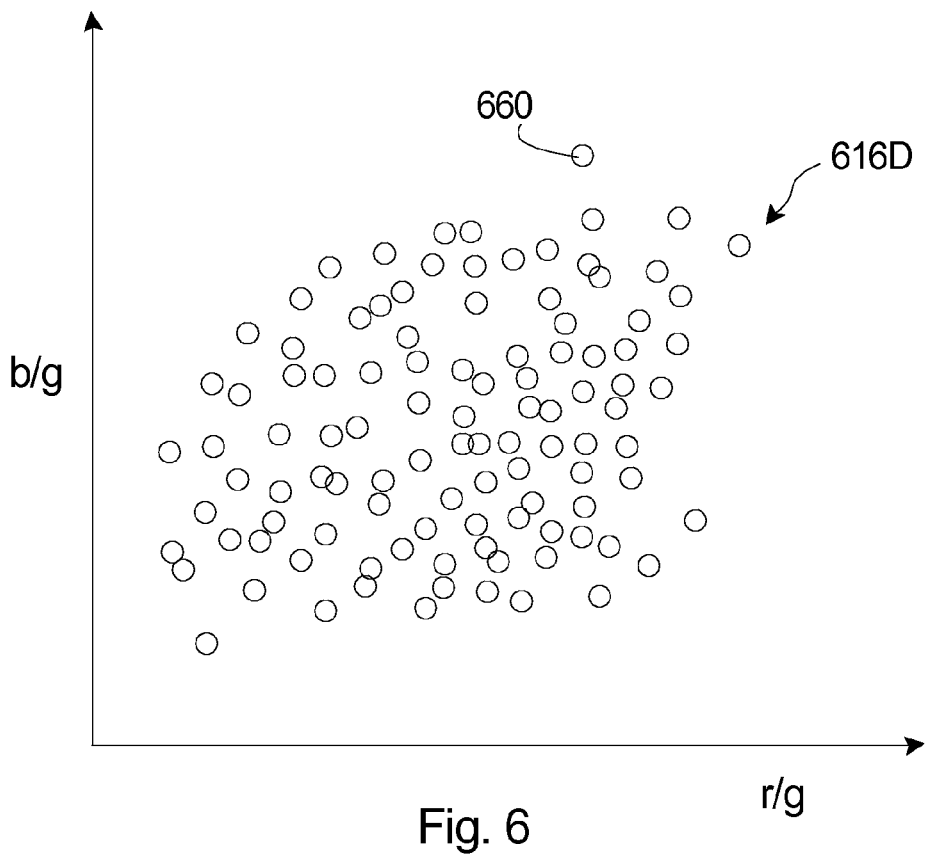
FIG. 6 is graph that illustrates input colors for an input image.

FIG. 6 is a simplified graph that illustrates non-redundant input colors 660 (represented as "O") for an input image 616 in two dimensional chromatic space. In this example, after the input image 616 is captured, the control system 232 determines the input color 660 at each pixel of the input image 616, and generates a list of input colors 660. Next, the control system 232 reduces the list of input colors 660 to a non-redundant list 762 (illustrated in FIG. 7C) of input colors 660. These non-redundant input colors 660 are illustrated in FIG. 6. The input colors 660 illustrated in FIG. 6 are merely an example of possible input colors 660 that was created to facilitate this discussion. Further, depending upon the characteristics of the scene 12, the input image 616 can include greater or fewer non-redundant input colors 660 and the distribution of these input colors 660 can be different than those illustrated in FIG. 6. For example, a typical input image 616 can include between approximately tens and thousands (depending upon the contents of the scene and the selection of the color space.) of non-redundant input colors 660.

In one embodiment, the input colors 660 are expressed in the same chromatic space as the gamuts 450A, 450B of possible illuminants 454A, 454B illustrated in FIGS. 4A, 4B. Alternatively, for example, the input colors 660 can be in RGB space.

Figure 7A:
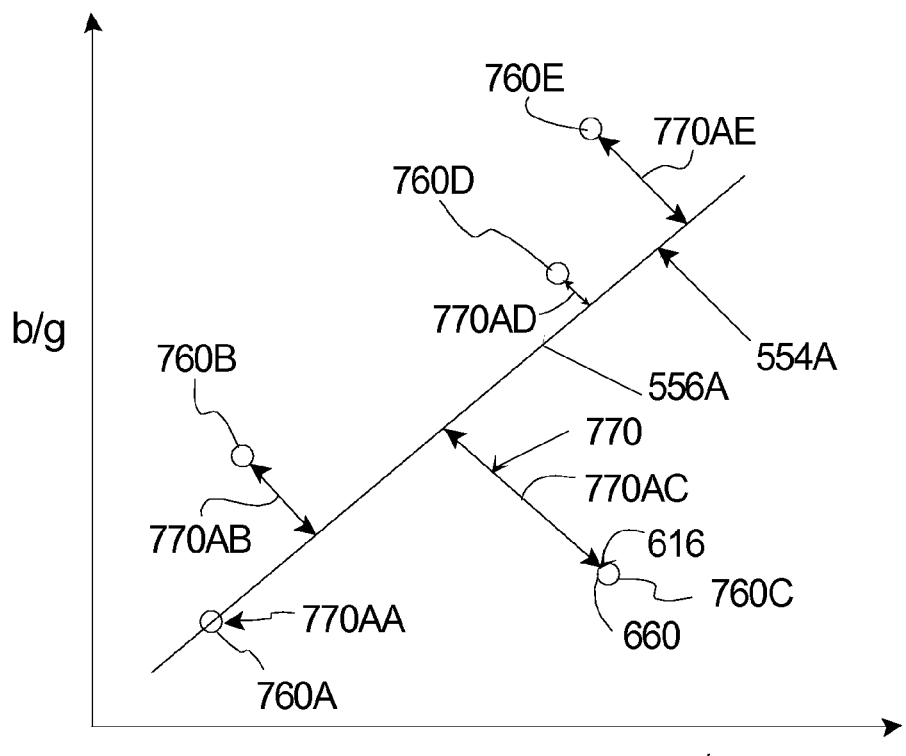
FIG. 7A is graph that illustrates both the subspace for the first possible illuminant and some of the input colors for the input image.

FIG. 7A is a simplified graph that illustrates both the subspace 556A for the first possible illuminant 554A and five of the non-redundant input colors 660 (represented as "O") for the input image 616. Somewhat similarly, FIG. 7B is simplified graph that illustrates both the subspace 556B for the second possible illuminant 554B and five of the non-redundant input colors 660 (represented as "O") for the input image 616.

Figure 7B:
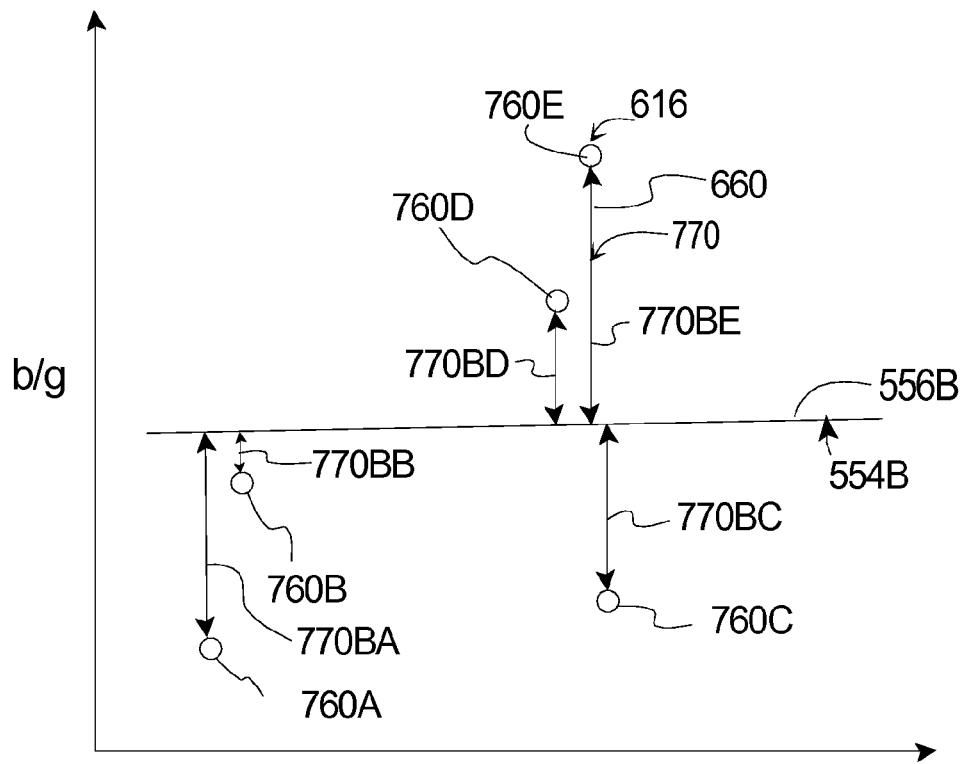
FIG. 7B is graph that illustrates both the subspace for the second possible illuminant and some of the input colors for the input image.

FIGS. 7A and 7B facilitate the discussion on how the control system 232 (illustrated in FIG. 2A) estimates the possible illuminant. As provided herein, in certain embodiments, the control system 232 uses software that directly computes and determines a consistency matching error and compares each of the non-redundant input colors 660 to the respective subspace 556A, 556B for each of the possible illuminants 554A, 554B in the illuminant database 245. In this embodiment, the control system 232 determines a separation distance 770 between each individual input color 660 and the subspace 556A, 556B for each possible illuminant 554A, 554B. Stated in another fashion, a separation distance 770 is assigned to each non-redundant input color 660 based on how far or close the input color 660 is to the closest point in the subspace 556A, 556B for each possible illuminant 554A, 554B.

For ease of discussion, in FIGS. 7A and 7B, only five input colors 660 are illustrated and one of the input colors 660 has been labeled a first input color 760A; one of the input colors 660 has been labeled a second input color 760B; one of the input colors 660 has been labeled a third input color 760C; one of the input colors 660 has been labeled a fourth input color 760D; and one of the input colors 660 has been labeled a fifth input color 760E.

For FIG. 7A, the control system 232 has determined (i) a first separation distance 770AA (can also referred to as a "first, first separation distance") between the first input color 760A and the first subspace 556A, (ii) a second separation distance 770AB (can also referred to as a "second, first separation distance") between the second input color 760B and the first subspace 556A, (iii) a third separation distance 770AC (can also referred to as a "third, first separation distance") between the third input color 760C and the first subspace 556A, (iv) a fourth separation distance 770AD (can also referred to as a "fourth, first separation distance")

between the fourth input color 760D and the first subspace 556A, and (v) a fifth separation distance 770AE (can also referred to as a "fifth, first separation distance") between the fifth input color 760E and the first subspace 556A.

Somewhat similarly, for FIG. 7B, the control system 232 has determined (i) a first separation distance 770BA (can also referred to as a "first, second separation distance") between the first input color 760A and the second subspace 556B, (ii) a second separation distance 770BB (can also referred to as a "second, second separation distance") between the second input color 760B and the second subspace 556B, (iii) a third separation distance 770BC (can also referred to as a "third, second separation distance") between the third input color 760C and the second subspace 556B, (iv) a fourth separation distance 770BD (can also referred to as a "fourth, second separation distance") between the fourth input color 760D and the second subspace 556B, and (v) a fifth separation distance 770BE (can also referred to as a "fifth, second separation distance") between the fifth input color 760E and the second subspace 556B.

In one non-exclusive example, a small distance can be assigned if the input color 660 is close to the respective subspace 556A, 556B, and a large distance can be assigned if the input color 660 is not close to the respective subspace 556A, 556B. The separation distance 770 can be computed by searching for the minimum chromaticity distance between each input color 660 and the respective subspace 556A, 556B. Stated in another fashion, for each input color 660 and each illuminant, there is a corresponding separation distance 770 that measures the minimum distance between each input color 660 and each illuminant. The separation distance 770 can be a root square mean distance. Alternatively, the separation distance 770 can be an absolute mean distance or other distance.

In addition, the separation distance 770 for each input color can be scaled based upon the appropriate brightness level of the input color (e.g. the green channel value) to give more weight for brighter colors as they tend to be more reliable than dark colors. The scaling adjustment can be optional and should be evaluated based on the tradeoff between computational complexity and potential gain in illuminant estimation accuracy.

With this implementation, for example, in FIG. 7A, the control system 232 can determine that (i) the first separation distance 770AA is approximately 0 because the input color 760A overlaps the first subspace 556A, (ii) the second separation distance 770AB is approximately 5, (iii) the third separation distance 770AC is approximately 11, (iv) the fourth separation distance 770AD is approximately 2, and (v) the fifth separation distance 770AE is approximately 6.5.

Further, in FIG. 7B, the control system 232 can determine that (i) the first separation distance 770BA is approximately 11, (ii) the second separation distance 770BB is approximately 2, (iii) the third separation distance 770BC is approximately 9, (iv) the fourth separation distance 770BD is approximately 6, and (v) the fifth separation distance 770BE is approximately 14.

It should be noted that the numbers used as examples for the separation distances used in the previous paragraphs are merely for ease of understanding, and the calculated separation distances can be different than these numbers.

In yet another embodiment, a large distance can be assigned if the input color is close to an observed color and a small distance can be assigned if there is no close observed color to the input color.

FIG. 7C is a chart that includes a matrix of a non-redundant list 762 of input colors and its respective separation distances 770 for a plurality of possible illuminants, including the first possible illuminant 554A, the second possible illuminant 554B, and a N Possible Illuminant.

In this embodiment, the control system 232 determines the separation distance 770 between each input color of the non-redundant set 762 and its point to the subspace 556A, 556B for each possible illuminant in the illuminant database 245.

Next, in this embodiment, the control system 232 adds each separation distance for each possible illuminant in the illuminant database to determine a total consistency matching error 772 for each possible illuminant in the illuminant database. After totaling the separation distances 770 for each illuminant, the control system 232 determines which of the possible illuminants has the best total consistency matching error. For example, if a small distance is assigned if the input color is close to the subspace, and a large distance is assigned if the input color is not close to the subspace, then the lowest total consistency matching error 772 is the best. In FIG. 7C, the first possible illuminant 564A has a total consistency matching error of 155, the second possible illuminant 564B has a total consistency matching error of 109, and the N possible illuminant has a total consistency matching error of 10. In this example, the N possible illuminant has the lowest and best total consistency matching error.

Alternatively, if a large distance is assigned if the input color is close to the subspace and a small distance is assigned if the input color is not close to the subspace, then the highest total consistency matching error is the best.

With the present method, the control system determines which of the possible illuminants has the best total consistency matching error. The illuminant with the best total consistency matching error shall be the estimated illuminant.

With this design, the image apparatus 10 can accurately estimate the illuminant of the scene 12 with relatively simple computations. This improves the performance of the image apparatus 10 and reduces the cost to manufacture the control system 232 and the image apparatus 10.

FIG. 7D is another chart that includes a matrix of a non-redundant list 762 of input colors and its respective separation distances 770 for a plurality of possible illuminants, including the first possible illuminant 554A, the second possible illuminant 554B, and a N Possible Illuminant. In this embodiment, the separation distances 770 has a predetermined maximum separation distance to avoid certain large separation distances from overly biasing the results. For example, in FIG. 7D, the control system 232 has a maximum separation distance of 8. In this example, if the separation distance is greater than or equal to 8, the control system will set the separation distance as 8. Alternatively, the maximum separation distance can be greater or less than 8. With this design, the current invention utilizes a non-uniform summation of the scaled distance from the input colors to the illuminant subspace.

Figure 8:
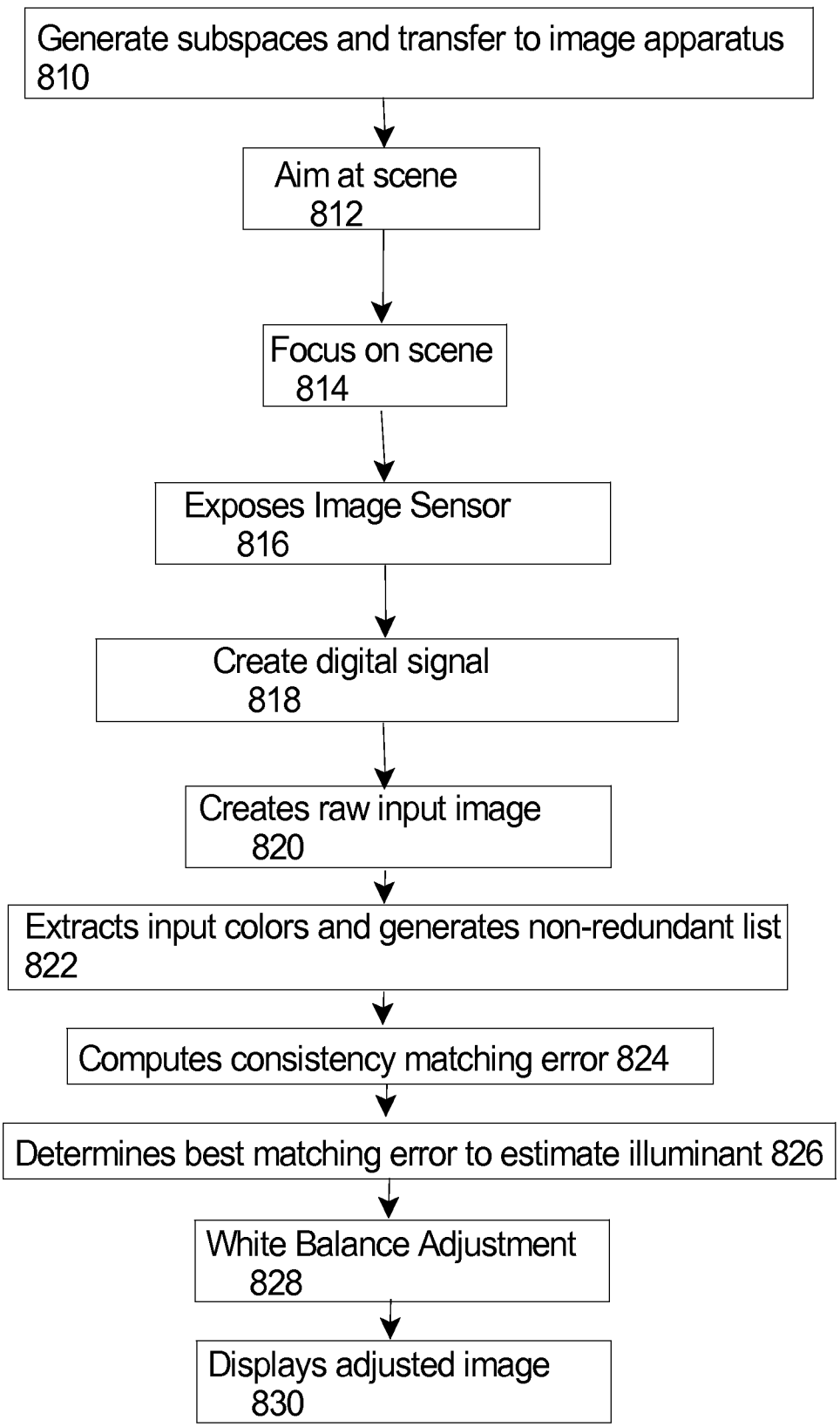
FIG. 8 is a flowchart that illustrates the operation of the image apparatus.

FIG. 8 is a simplified flow chart that further illustrates one non-exclusive example the operation of the image apparatus. It should be noted that one or more of the steps can be omitted or the order of steps can be switched. First, the subspaces for the desired possible illuminants are generated and are transferred to the image apparatus 810. Next, the image apparatus is aimed toward the scene 812. Subsequently, the user presses lightly on the shutter button to enable the image apparatus to automatically focus on the object(s) 814. Next, the user presses the shutter button all the way, which resets the image sensor, and exposes the image sensor to light 816. Next, the control system measures the charge at each photosite of the image sensor and creates a digital signal that represents the values of the charge at each photosite 818. Subsequently, the control system interpolates the data from the different photosites, with assistance from the filtering component, to create the raw input image 820. Next, the control system extracts the input colors from the input image 822 and generates a non-redundant list of input colors. Subsequently, the control system computes the consistency matching error for the input colors to each of the illuminant gamuts in the illuminant database 824. Next, the control system determines the estimated initial illuminant by selecting the possible illuminant with best total consistency error 826. Subsequently, the control system performs color correction on the input image based on the estimated final illuminant 828. Finally, the adjusted image 830 can be displayed.

Figure 9:
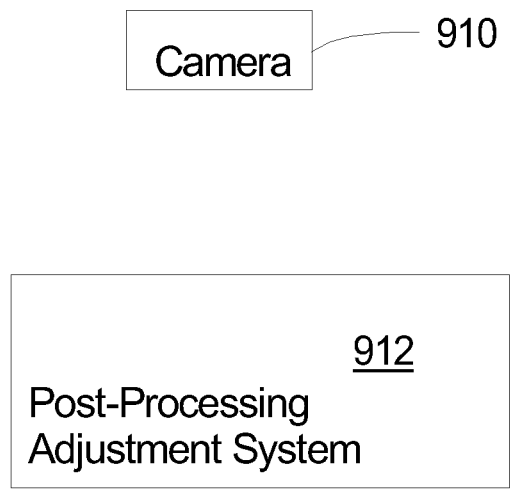
FIG. 9 is a simplified illustration of another embodiment of a system having features of the present invention.

FIG. 9 is a simplified illustration of a combination having features of the present invention, including a camera 910, and a post-processing adjustment system 912. In this embodiment, the camera 910 captures the input image (not shown in FIG. 9) and the adjustment system 912 estimates the illuminant and performs the appropriate levels of white balance adjustment to the input image. In this embodiment, the adjustment system 912 includes a control system with software that (i) evaluates the input image to estimate the illuminant, and (ii) performs white balance adjustment on the input image based on the estimated illuminant.

In FIG. 9, the captured image can be transferred to the adjustment system 912 via an electrical connection line (not shown), a wireless connection, or in another fashion. For example, the camera 910 can include a removable storage system (not shown in FIG. 9) that is selectively removed from the camera 910 and inserted into a docking port (not shown) of the adjustment system 912.

The design of the adjustment system 912 can be varied. For example, the adjustment system 912 can be a personal computer that includes the appropriate software.

It should be noted that the methods of estimating the possible illuminant described above can be used in combination with one or more other prior art automatic white balance algorithms. For example, the method disclosed herein can be used in conjunction with a "gray world" illuminant estimation approach, a "white patch" illuminant estimation approach, or variations thereof.

In the "gray world" illuminant estimation approach, it is assumed that for an image of sufficiently varied colors, the average surface reflectance is "gray". Therefore, it simply takes the average colors of the image as the gray color and adjusts the image accordingly.

In the "white patch" illuminant estimation approach, it is assumed that the brightest pixels of an image reflect the actual color of the light source. This would be especially relevant for pixels corresponding to a point on glossy or specular surfaces. This method searches for these pixels and takes them as the scene illuminant color.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. An image apparatus for determining an estimated illuminant of a scene, the image apparatus comprising:
   a capturing system including an image sensor that captures an input image of the scene, the input image including a plurality of input colors, including a first input color and a second input color;
   a storage system that includes a memory that stores an illuminant database that includes a one-dimensional chromatic subspace for a first illuminant and a one-dimensional chromatic subspace for a second illuminant that is different from the first illuminant; and
   a control system including a processor that accesses the illuminant database from the storage system to estimate the estimated illuminant of the scene, wherein the control system (i) compares the first input color to the one-dimensional chromatic subspace for the first illuminant to compute a first, first separation distance that represents how far or close the first input color is to the one-dimensional chromatic subspace for the first illuminant; and (ii) compares the first input color to the one-dimensional chromatic subspace for the second illuminant to compute a first, second separation distance that represents how far or close the first input color is to the one-dimensional chromatic subspace for the second illuminant.

2. The image apparatus of claim 1 wherein the control system (i) compares the second input color to the one-dimensional chromatic subspace for the first illuminant to compute a second, first separation distance that represents how far or close the second input color is to the one-dimensional chromatic subspace for the first illuminant; and (ii) compares the second input color to the one-dimensional chromatic subspace for the second illuminant to compute a second, second separation distance that represents how far or close the second input color is to the one-dimensional chromatic subspace for the second illuminant.

3. The image apparatus of claim 2 wherein the control system adds the first separation distances to determine a total consistency matching error for the first illuminant, and adds the second separation distances to determine a total consistency matching error for the second illuminant.

4. The image apparatus of claim 2 wherein the control system takes a non-uniform summation of the first separation distances to determine a total consistency matching error for the first illuminant, and a non-uniform summation of the second separation distances to determine a total consistency matching error for the second illuminant.

5. The image apparatus of claim 2 wherein at least one of the separation distances is a root mean square distance.

6. The image apparatus of claim 2 wherein at least one of the separation distances is an absolute mean distance.

7. The image apparatus of claim 2 wherein the control system utilizes brightness level information of the input colors for scaling the separation distances.

8. The image apparatus of claim 7 wherein the one-dimensional chromatic subspace for the first illuminant is created from two-dimensional color information in chromatic space for the first illuminant that is reduced using Principal Component Analysis, and the one-dimensional chromatic subspace for the second illuminant is created from two-dimensional color information in chromatic space for the second illuminant that is reduced using Principal Component Analysis.

9. An image apparatus for determining an estimated illuminant of a scene, the image apparatus comprising:
   a capturing system including an image sensor that captures an input image of the scene, the input image including a plurality of input colors;
   a storage system that incldues a memory that stores an illuminant database that includes a one-dimensional chromatic subspace for a first illuminant and a one-dimensional chromatic subspace for a second illuminant that is different from the first illuminant; and
   a control system including a processor that accesses the illuminant database from the storage system to estimate the estimated illuminant of the scene, wherein the control system (i) generates a non-redundant list of non-redundant input colors from the plurality of input colors; (ii) computes a separate, first separation distance for each non-redundant input color that represents how far or close that particular non-redundant input color is to the one-dimensional chromatic subspace for the first illuminant; and (iii) computes a separate, second separation distance for each non-redundant input color that represents how far or close that particular non-redundant input color is to the one-dimensional chromatic subspace for the second illuminant.

10. The image apparatus of claim 9 wherein the control system adds the first separation distances to determine a total consistency matching error for the first illuminant, and adds the second separation distances to determine a total consistency matching error for the second illuminant.

11. The image apparatus of claim 9 wherein the control system takes a non-uniform summation of the first separation distances to determine a total consistency matching error for the first illuminant, and a non-uniform summation of the second separation distances to determine a total consistency matching error for the second illuminant.

12. The image apparatus of claim 9 wherein the one-dimensional chromatic subspace for the first illuminant is created from two-dimensional color information in chromatic space for the first illuminant that is reduced using Principal Component Analysis, and the one-dimensional chromatic subspace for the second illuminant is created from two-dimensional color information in chromatic space for the second illuminant that is reduced using Principal Component Analysis.

13. A method for determining an estimated illuminant of a scene comprising:
creating an illuminant database comprising (i) providing two-dimensional color information in chromatic space for a first illuminant; (ii) providing two-dimensional color information in chromatic space for a second illuminant; (iii) creating the illuminant database using a control system that includes a processor, the control system reducing the two-dimensional color information in chromatic space for the first illuminant to a one-dimensional chromatic subspace for the first illuminant; and reducing the two-dimensional color information in chromatic space for the second illuminant to a one-dimensional chromatic subspace for the second illuminant; and transferring the illuminant database to a storage system that includes a memory;
capturing an input image of the scene with an image sensor, the input image including a first input color and a second input color; and
comparing the first input color and the second input color to each of the one-dimensional chromatic subspaces of the illuminant database; wherein the step of comparing includes (i) comparing the first input color to the one-dimensional chromatic subspace for the first illuminant to compute a first, first separation distance that represents how far or close the first input color is to the one-dimensional chromatic subspace for the first illuminant; (ii) comparing the first input color to the one-dimensional chromatic subspace for the second illuminant to compute a first, second separation distance that represents how far or close the first input color is to the one-dimensional chromatic subspace for the second illuminant; (iii) comparing the second input color to the one-dimensional chromatic subspace for the first illuminant to compute a second, first separation distance that represents how far or close the second input color is to the one-dimensional chromatic subspace for the first illuminant; and (iv) comparing the second input color to the one-dimensional chromatic subspace for the second illuminant to compute a second, second separation distance that represents how far or close the second input color is to the one-dimensional chromatic subspace for the second illuminant.

14. The method of claim 13 wherein the step of creating includes (i) the two-dimensional color information in chromatic space for the first illuminant being reduced using Principal Component Analysis to the one-dimensional chromatic subspace for the first illuminant; and (ii) the two-dimensional color information in chromatic space for the second illuminant being reduced using Principal Component Analysis to the one-dimensional chromatic subspace for the second illuminant.

15. The method of claim 13 further comprising the steps of adding the first separation distances to determine a total consistency matching error for the first illuminant, and adding the second separation distances to determine a total consistency matching error for the second illuminant.

* * * * *